Nov. 19, 1929.  W. GOETZELMAN  1,736,154
PIPE CONNECTER
Filed Feb. 20, 1926  2 Sheets-Sheet 1
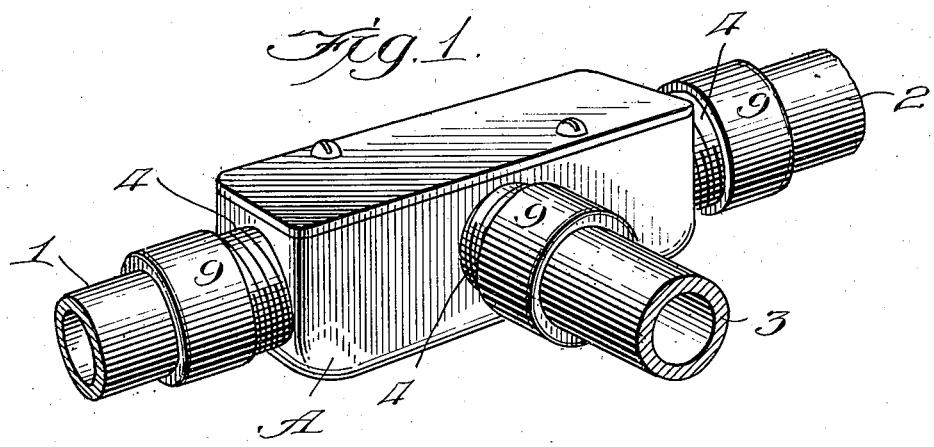
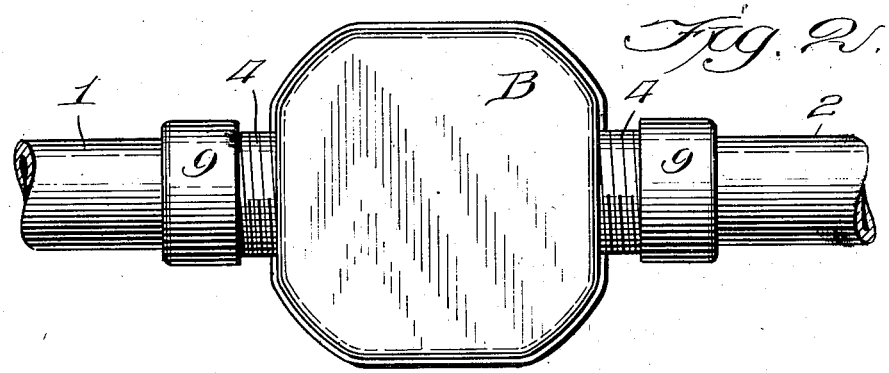
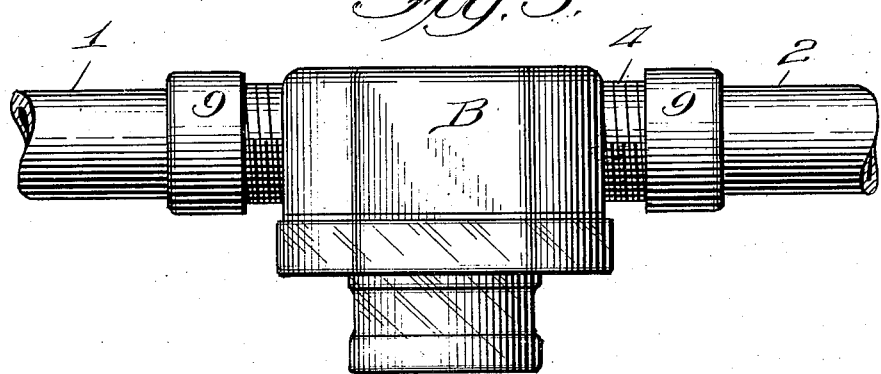
Inventor,
William Goetzelman
by Wm. F. Freudenreich,
Atty Nov. 19, 1929.   W. GOETZELMAN   1,736,154
PIPE CONNECTER
Filed Feb. 20, 1926    2 Sheets-Sheet 2
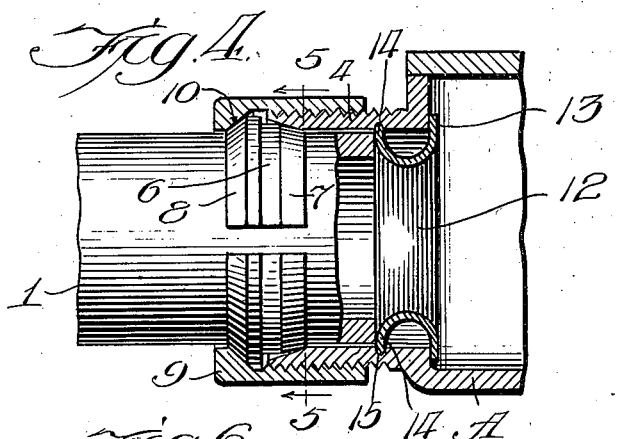
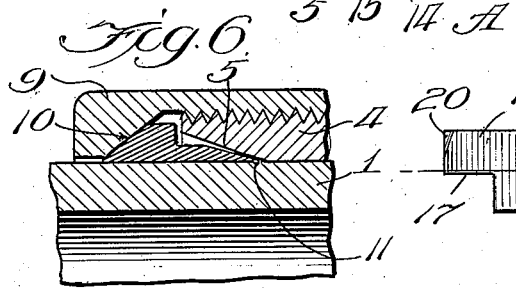
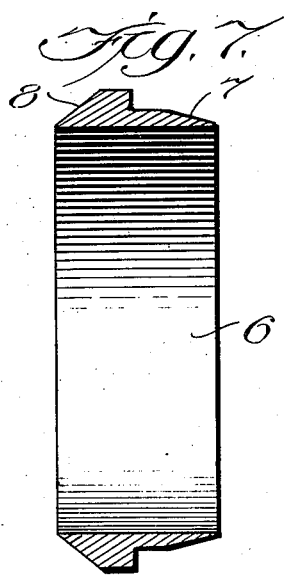
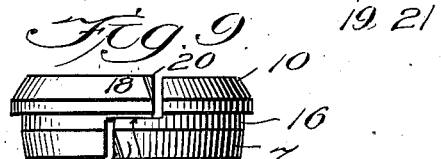
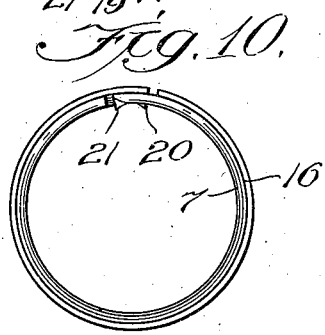
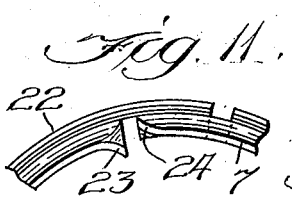
Inventor:
William Goetzelman Patented Nov. 19, 1929

1,736,154

UNITED STATES PATENT OFFICE

WILLIAM GOETZELMAN, OF CHICAGO, ILLINOIS, ASSIGNOR TO APPLETON ELECTRIC COMPANY, A CORPORATION OF ILLINOIS

PIPE CONNECTER

Application filed February 20, 1926. Serial No. 89,555.

The wires of lighting and power systems distributed throughout buildings are carried through protecting conduits between inlet and outlet boxes and, specifically considered, the present invention relates to the means for attaching the conduits to said boxes, although it is also useful in other fields. The invention relates particularly to connections between metal pipes and boxes or other devices, and has for its object to produce a simple and reliable connection that does not require the cutting of threads on the pipes.

A further object of the present invention is to produce a simple and novel connection between an unthreaded painted, enameled or japanned metal pipe which will insure a good electrical connection between the pipe and said device.

A further object of the present invention is to produce a simple and novel sealed connection between an unthreaded pipe and another device.

At the point where a cable passes out of a conduit into a box, means must be provided to protect the cable from being injured by the sharp edge on the pipe. One of the objects of the present invention is to produce a simple and novel attachment to be placed in an inlet or outlet box adjacent to the end of a pipe connected thereto, to afford a smooth and rounded surface for engagement with the cable.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:—

Figure 1 is a perspective view of a box having three pipes connected thereto in accordance with the present invention; Fig. 2 is a top plan view and Fig. 3 a side view of an outlet box having two pipes connected thereto in accordance with the present invention; Fig. 4 is a section, on an enlarged scale, through one end of the box shown in Fig. 1 along a plane containing the long axis of one of the pipes, the pipe and the wedging connection ring being shown in elevation; Fig. 5 is a section taken approximately on line 5—5 of Fig. 4; Fig. 6 is a section on a still larger scale on a plane containing the long axis of the pipe, showing a fragment of the joint or connection; Fig. 7 is a section, on the same scale as Fig. 6, through the wedging ring; Fig. 8 is a plan view of a modified form of wedging ring in a flattened or developed condition; Fig. 9 is an edge view of the ring illustrated in Fig. 8; Fig. 10 is an end view of the ring shown in Fig. 9; and Fig. 11 is an edge view of a fragment of a ring somewhat different from that shown in Figs. 8 to 10.

In Fig. 1 of the drawings, A represents a box to which are connected three pipes 1, 2 and 3. The box is provided with external threaded nipples 4 to which the several pipes are coupled. In Figs. 2 and 3 there is shown a common form of outlet box B to which are connected two pipes 1 and 2, this box having nipples similar to those in Fig. 1, to which nipples the pipes are connected.

One form of my improved connection is illustrated in detail in Figs. 4 to 7. Referring to these figures, it will be seen that the end of the pipe 1 is inserted in the nipple, the pipe being simply cut off and slipped into place without having any other operation performed thereon. The mouth of the opening in the nipple is made frusto-conical, as indicated at 5. A divided or split ring 6 having a taper 7 at one end is slipped over the pipe, the tapered portion entering the flaring mouth in the nipple. The taper on the ring is less sharp than the taper within the nipple, so that when the ring is pushed into the nipple it is engaged by the latter only about the thin portion at the extreme margin of the ring. On the other end of the ring there is a second tapered portion 8 that is preferably sharper or steeper than the taper 7. The ring is forced into the nipple by means of a coupling sleeve 9 screw-threaded upon the nipple and having an internal inclined face or fillet 10 complementary to the taper 8 on the ring.

To secure the pipe in place, the sleeve 9 is first slipped on the same, and then the ring is put in place. The end of the pipe is then inserted in the nipple and the coupling sleeve is moved along the pipe until its threads may be engaged with those on the nipple, the sleeve carrying the ring with it. As the sleeve is screwed on the nipple, it moves the ring toward the latter until the advancing tapered end of the ring engages the taper within the nipple. The advanced end of the ring is comparatively thin and, as pressure is applied to it by the nipple, in a direction tending to reduce its diameter, its sharp edge will be bent inwardly toward the long axis of the pipe, causing it to bite as indicated at 11, into the surface of the pipe. There will be an appreciable bodily movement of the ring while the deflecting of its sharp edge is taking place, and therefore this sharp edge will cut through the enamel or other protective covering on the pipe and will enter the metal so as to form a good electrically-conductive contact with the pipe. During the fastening operation, the clamping ring as a whole is being compressed into a smaller diameter, whereby it is caused to grip the pipe with a strong pressure and thus securely lock the pipe against withdrawal.

The device for holding a cable that passes through the pipe out of contact with the sharp edge at the end of the pipe, consists of a ring 12, U-shaped in cross section, fitted within the box in a position to form an abutment for the inner end of the pipe; the internal diameter of the ring being less than the internal diameter of the pipe. The ring is conveniently formed from a blank comprising a short tube having at one end an outwardly directed flange 13 whose external diameter is greater than the diameter of the opening through the nipple. This sleeve is inserted into the nipple from within the box, with the flange resting against the inner side of the box. The outer end of the sleeve is then worked so as to carry it laterally in the form of a second flange 14. Within the nipple is a shallow annular groove 15, in position to receive the edge of the flange 14 and lock the completed ring in place.

Instead of dividing the clamping ring along a straight line parallel with the long axis of the pipe, as shown in Fig. 4, the division may be along a staggered line. Thus in Figs. 8, 9 and 10 there is shown a clamping ring 16 having tapered ends 7 and 10. The meeting ends of the ring are formed to overlap; the ring being cut half way through from opposite sides along lines displaced angularly of the ring with respect to each other, these lines being connected at their inner ends by a dividing cut along a line 17 that extends in the circumferential direction. In the arrangement shown in Fig. 4, the joint between the pipe and the box is not sealed, because there is a passage from the interior of the box and along the outer side of the pipe between the spaced ends of the ring.

In order to secure an effective seal by means of the ring as shown in Figs. 8 to 10, I prefer so to shape the ring that its ends are slightly helical. In other words, the overlapping end pieces 18 and 19 have a combined width, in the direction of the length of the ring, slightly greater than the length of the ring at other points. The result is that the tapered part 7 on one side of and adjacent to the gap in the ring and the tapered part 10 on the other side of the gap engage the nipple and the coupling sleeve, respectively, before the remaining portions of the tapers touch the seats on those parts. The result is that the members 18 and 19 are pressed tightly together and form an effective seal when the coupling sleeve is tightened on the nipple.

If desired, one outer sharp corner at each end of the ring may be bent to form teeth that will bite into the members engaged with the ring. In Figs. 8 to 10, two of such corners are bent inwardly toward the central axis of the ring, as indicated at 20 and 21. Two teeth are thus formed, facing in opposite direction, to bite into the surface of the pipe when the coupling sleeve is tightened.

In Fig. 11, the ring 22 has the sharp corners bent in opposite directions, to enable it to serve as a lock washer, through a tooth 23 that extends inwardly from the ring and a second tooth 24 that projects outwardly. One of these teeth will bite into the pipe, and the other will bite into one of the members surrounding the ring.

As the rings shown in Figs. 8 to 11 are forced along the pipe, while being contracted by the inclined bearing seats in the nipple and the coupling sleeve, the sharp bent corners or teeth will scrape the enamel from the pipe and this enamel will enter the gaps in the ring beside the teeth. Thus provision is made to take care of the loosened enamel and, if there is enough of the latter, it will fill the gaps and add to the effectiveness of the seal between the pipe and the nipple.

It will thus be seen that I have produced a quickly-applied and quickly-detachable connection between an unthreaded pipe and a box or a nipple; which connection is not only secure but affords good electrical conductivity between the parts even though the pipe be enamelled or coated with other non-conducting material. It will also be seen that I have produced a simple and novel device for protecting a cable at the point where it leaves a pipe and enters a box.

While I have illustrated and described with particularity only a single preferred form of my invention, with a few simple modifications, I do not desire to be limited to the exact structural details thus illustrated and described; but intend to cover all forms and arrangements which come within the definitions of my invention constituting the appended claims.

I claim:

1. In combination, an externally threaded tubular member terminating at one end in a frusto-conical mouth, a cylindrical member extending into said mouth, a divided ring surrounding said cylindrical member, the ends of said ring being tapered in opposite directions, the taper of that end toward said tubular member being at a lesser angle than that of the said mouth and terminating in a thin edge, and a coupling sleeve surrounding said cylindrical member and engaged with the threads on the tubular member, said sleeve having an internal bearing seat engaged with the tapered part of the outer end of said ring to force the ring into said mouth and to cooperate with said mouth to contract the ring upon said cylindrical member.

2. In combination, an externally-threaded tubular member terminating at one end in a frusto-conical mouth, a cylindrical member extending into said mouth, a divided ring surrounding said cylindrical member, the inner end of the ring being tapered at a lesser angle than that of said mouth and terminating in a thin edge, a coupling sleeve surrounding said cylindrical member and engaged with the threads on the tubular member, and cooperating elements on said sleeve and said ring whereby the sleeve acts simultaneously to compress the ring and force it into said mouth until said thin edge is turned and bites into said cylindrical member.

In testimony whereof, I sign this specification.

WILLIAM GOETZELMAN.